No. 684,013. Patented Oct. 8, 1901.
J. T. WARREN.
ELEVATOR LOCK.
(Application filed Feb. 21, 1901.)
(No Model.)
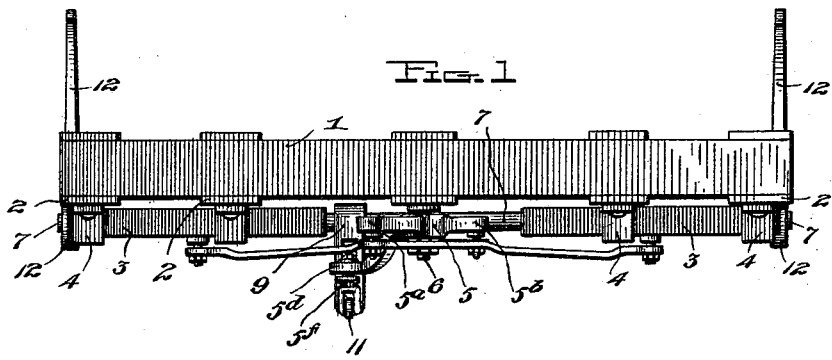
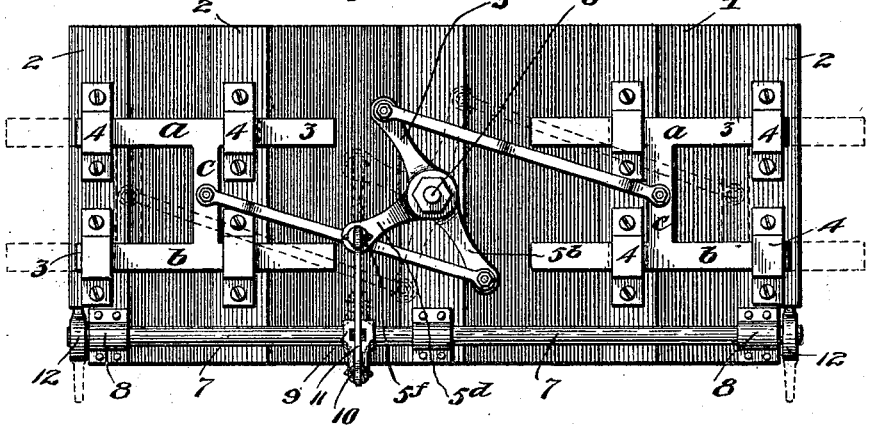
Witnesses
Inventor
J. T. Warren
Attorneys

UNITED STATES PATENT OFFICE.

JOHN THOMAS WARREN, OF NANAIMO, CANADA.

ELEVATOR-LOCK.

SPECIFICATION forming part of Letters Patent No. 684,013, dated October 8, 1901.

Application filed February 21, 1901. Serial No. 48,250. (No model.)

*To all whom it may concern:*

Be it known that I, JOHN THOMAS WARREN, a subject of the King of Great Britain, residing at Nanaimo, Vancouver Island, in the Province of British Columbia and Dominion of Canada, have invented certain new and useful Improvements in Elevator-Locks; and I do declare the following to be a full, clear, and exact description of the invention, such as will enable others skilled in the art to which it appertains to make and use the same.

The invention relates to elevator-locks.

The object of the invention is to provide a lock of this character which shall be simple of construction, durable in use, comparatively inexpensive of production, and easily operated, and is designed for use on mining-cages or on elevator-cages employed in buildings, and is intended to lock the cage positively against movement, the construction being such that when the bolts are shot the cage can neither ascend nor descend until the bolts are withdrawn from their keepers, thus preventing tampering with the elevator after the attendant has left it by unauthorized persons.

With these and other objects in view the invention consists of certain novel features of construction, combination, and arrangement of parts, which will be hereinafter more fully described, and particularly pointed out in the appended claim.

In the accompanying drawings, Figure 1 is a side view of the floor of an elevator-cage, showing my improved lock attached thereto, parts being broken away to more clearly illustrate the invention. Fig. 2 is an end view of the same with parts broken away. Fig. 3 is a bottom plan view showing in full lines the bolts in shot position and in dotted lines in retracted position.

In the drawings, 1 denotes the floor of a mining or elevator cage, to the under side of which may be bolted a series of iron bars 2. 3 denotes bolts mounted to slide in bearings 4, bolted to said iron bars at each end of the floor. Each bolt consists of two parts $a$ and $b$, connected together by a cross-piece $c$.

5 denotes a bell-crank lever pivoted by a bolt 6 to the under side of the floor and having its arms $5^a$ and $5^b$ connected by pivoted links to the cross-pieces of the bolts and having its arm $5^d$ provided with a swiveled stud $5^f$.

7 denotes a rock-shaft mounted in bearings 8, secured to the under side of the floor of the cage and provided with a downwardly-extending arm 9, in which is swiveled a stud 10, which is connected to the swiveled stud $5^f$ of the bell-crank lever by a link 11.

12 denotes operating-levers, which are fixed to the rock-shaft and project up through recesses in the floor of the cage within convenient reach of the attendant.

Assuming that it be desired to lock the cage against movement, one of the levers is rocked in the proper direction, thus shooting the bolts outwardly into keepers (not shown) secured at proper points at the different landings. In this position it will be impossible for a person to start the elevator-cage by operating the controlling-rope. The elevator-cage is positively locked against movement, and not until it is released by the retraction of the bolts, which may be accomplished by moving the lever in a reverse direction, can it either ascend or descend.

From the foregoing description, taken in connection with the accompanying drawings, the construction, mode of operation, and advantages of my invention will be readily understood without requiring a more extended explanation.

Various changes in the form, proportion, and minor details of construction may be made within the scope of the invention without departing from the spirit or sacrificing any of the advantages thereof.

Having thus described my invention, what I claim, and desire to secure by Letters Patent, is—

The combination with a cage, of bearings upon the bottom of the cage, H-shaped bolts slidably mounted in said bearings, a bell-crank lever having three arms, links connecting the bolts to two of the arms of the bell-crank lever, said links being connected to the cross-piece of the bolts intermediate the side arms thereof so as to equalize the strain, a stud swiveled to the third arm of the bell-crank lever, a rock-shaft journaled upon the bottom of the cage and provided with an operating-lever, an arm fixed to the rock-shaft, a stud swiveled to the arm, and a link connecting the two swiveled studs, substantially as described.

In testimony whereof I have hereunto set my hand in presence of two subscribing witnesses.

JOHN THOMAS WARREN.

Witnesses:
WILLIAM KIDD,
WILL T. MORRIS.